(No Model.) 5 Sheets—Sheet 3.

J. A. HILBERT.
CORN HARVESTING AND HUSKING MACHINE.

No. 385,861. Patented July 10, 1888.

WITNESSES:
Chas. Niera
C. Sedgwick

INVENTOR:
J. A. Hilbert
BY Munn & Co.
ATTORNEYS.

(No Model.) 5 Sheets—Sheet 4.
J. A. HILBERT.
CORN HARVESTING AND HUSKING MACHINE.
No. 385,861. Patented July 10, 1888.
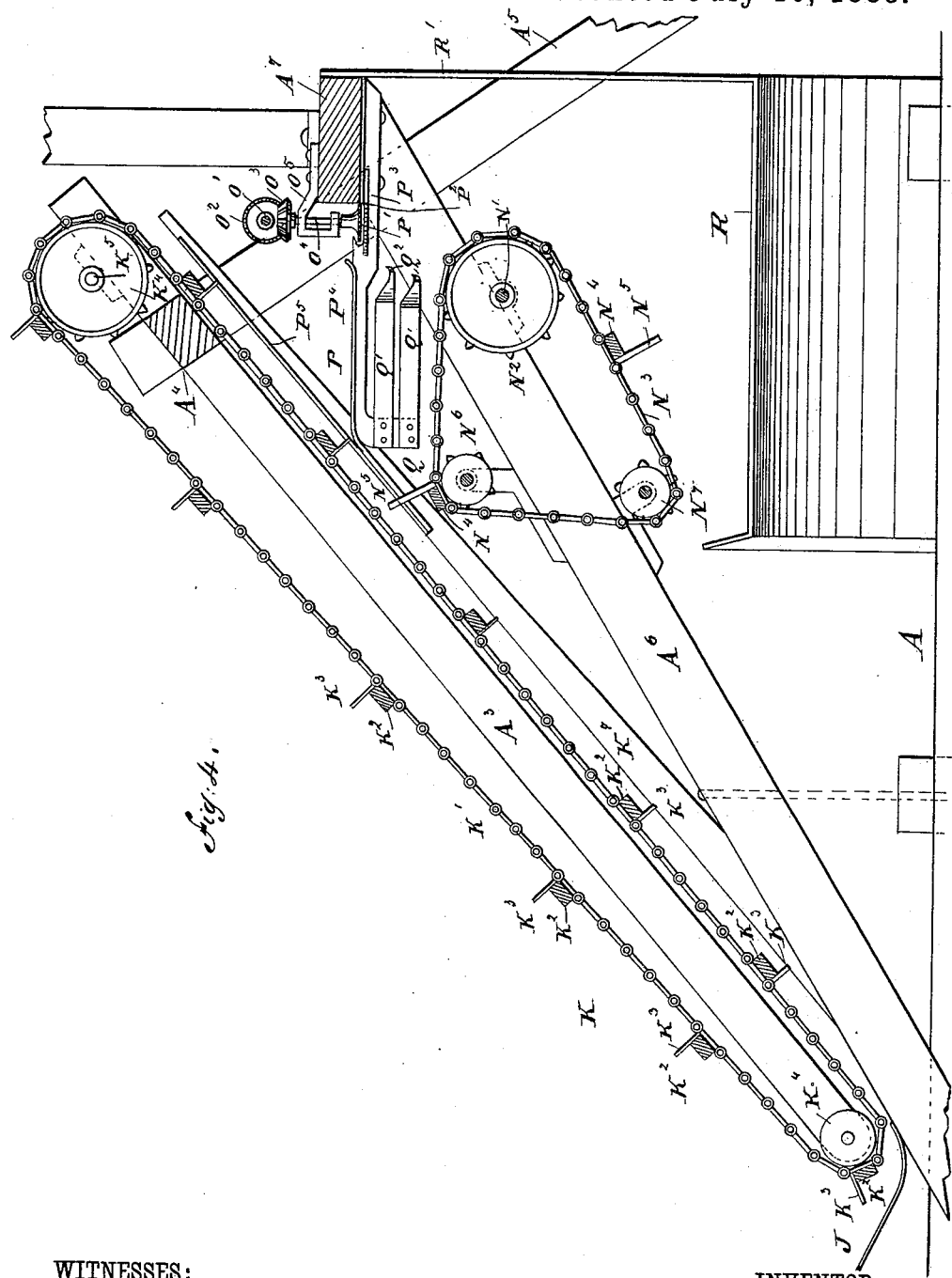
WITNESSES:
INVENTOR:
J. A. Hilbert
BY Munn & Co.
ATTORNEYS.

(No Model.) 5 Sheets—Sheet 5.
J. A. HILBERT.
CORN HARVESTING AND HUSKING MACHINE.
No. 385,861. Patented July 10, 1888.
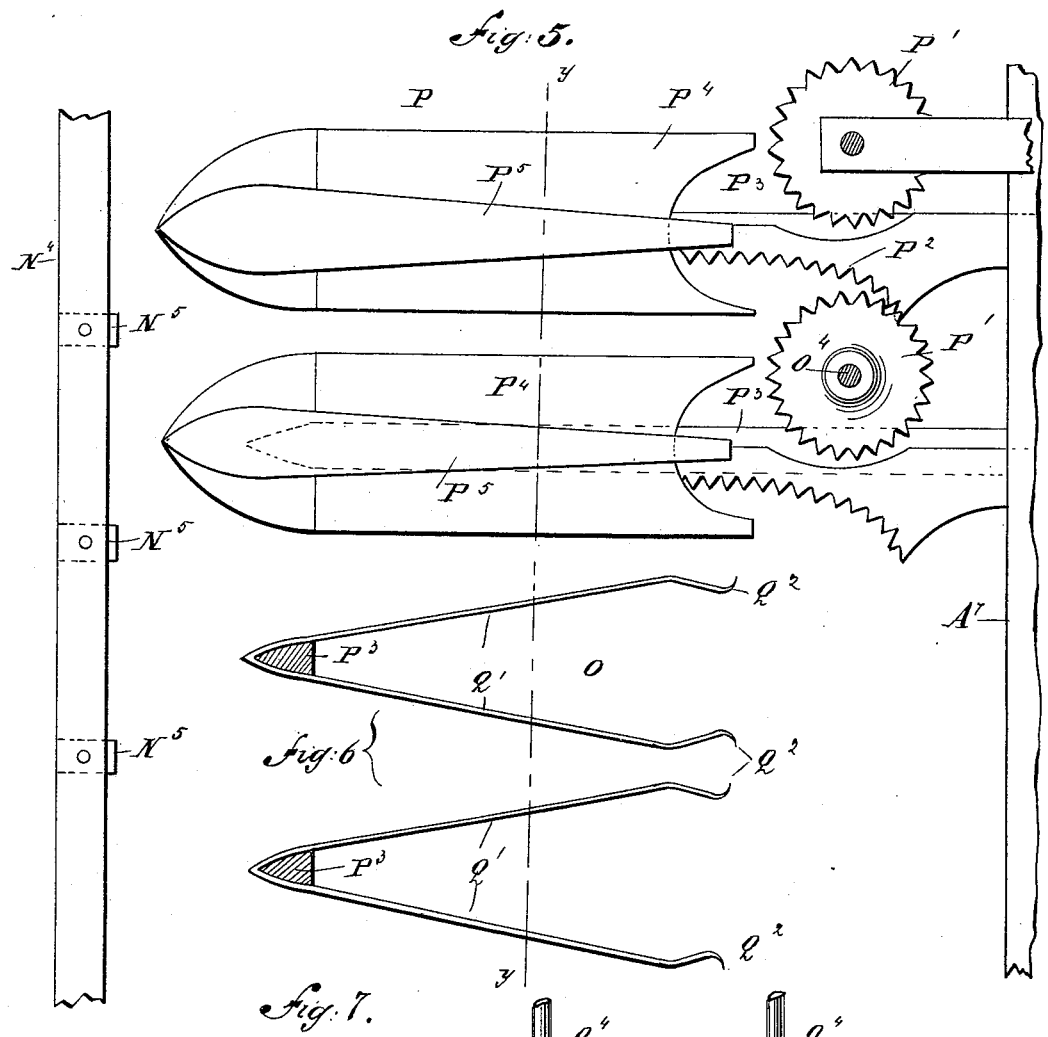
WITNESSES:
INVENTOR:
BY
ATTORNEYS.

UNITED STATES PATENT OFFICE.

JOHN ALOYSIUS HILBERT, OF CARROLL, IOWA.

CORN HARVESTING AND HUSKING MACHINE.

SPECIFICATION forming part of Letters Patent No. 385,861, dated July 10, 1888.

Application filed June 30, 1887. Serial No. 243,021. (No model.)

*To all whom it may concern:*

Be it known that I, JOHN ALOYSIUS HILBERT, of Carroll, in the county of Carroll and State of Iowa, have invented a new and Improved Corn Harvesting and Husking Machine, of which the following is a full, clear, and exact description.

My invention relates to certain new and useful improvements in the corn harvesting and husking machine for which United States Letters Patent No. 351,916, dated November 2, 1886, were granted to me.

The object of my invention is to provide a new and improved machine for cutting corn-stalks, separating the ears from the stalks, husking the ears, delivering the husked ears to a wagon traveling with the machine, and placing the stalks in a row or in a pile on the ground.

The invention consists in the construction and arrangement of various parts and details and combinations of the same, as will be fully described hereinafter, and then pointed out in the claims.

Reference is to be had to the accompanying drawings, forming a part of this specification, in which similar letters of reference indicate corresponding parts in all the figures.

Figure 1:
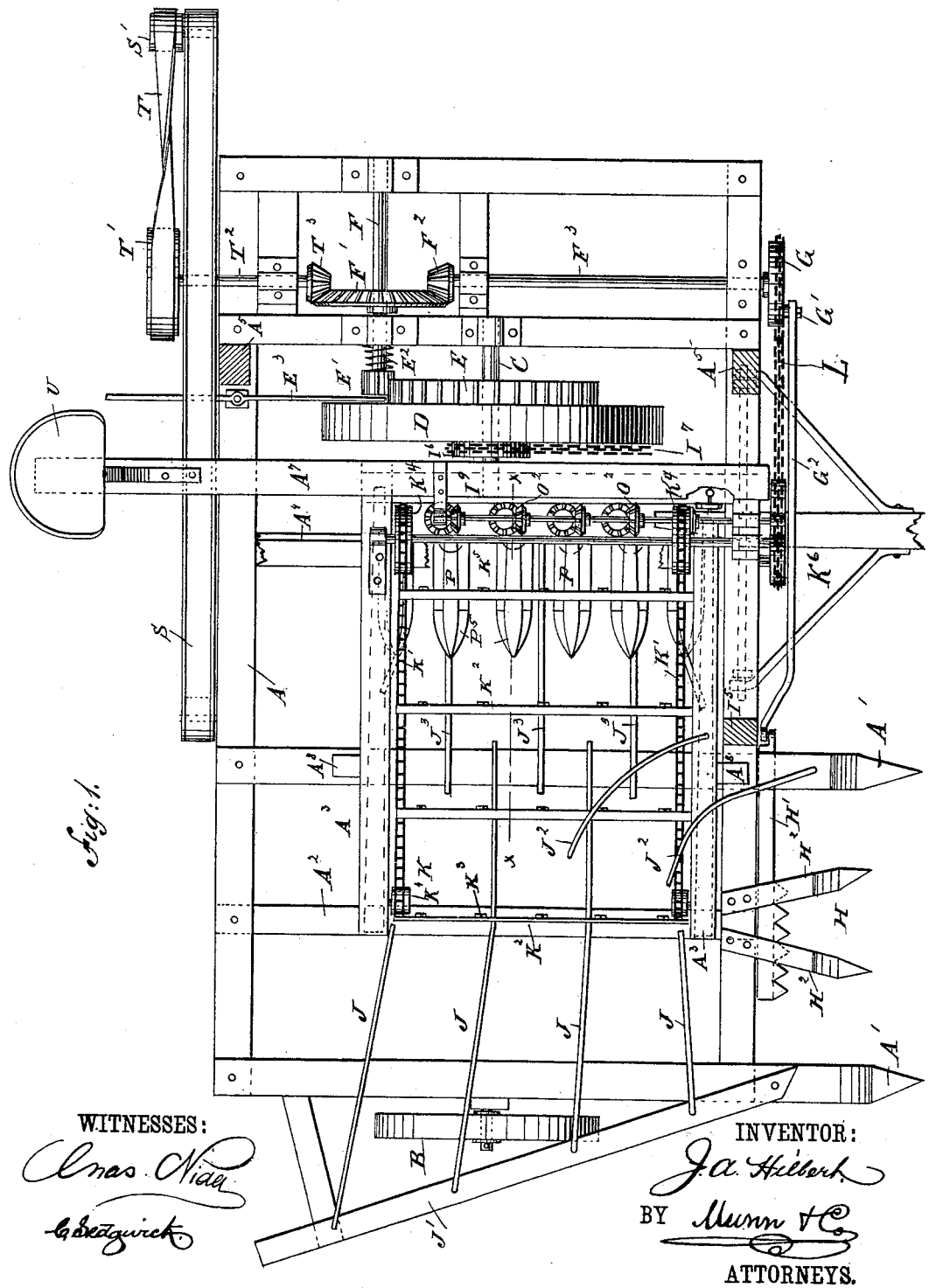
Figure 2:
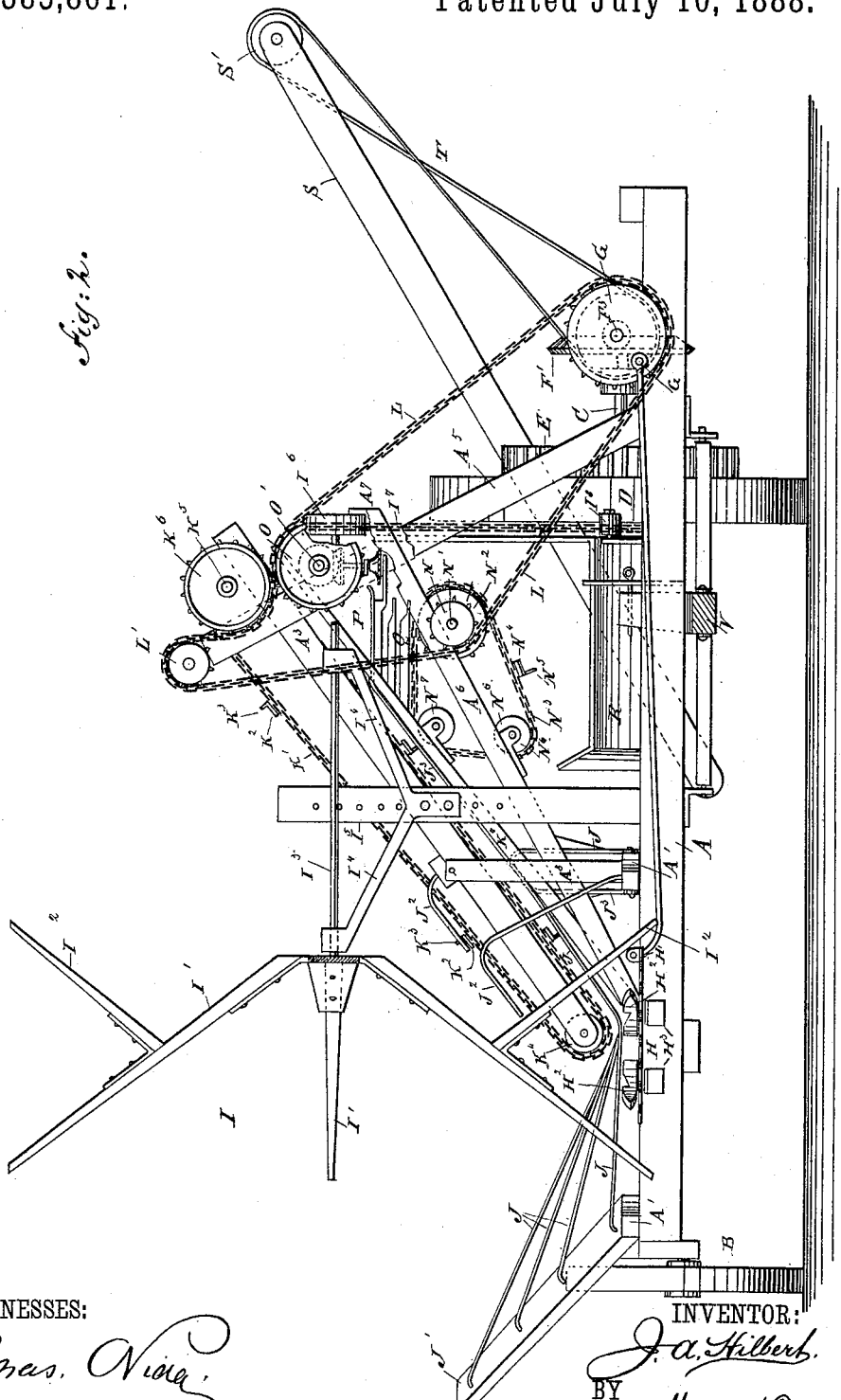
Figure 3:
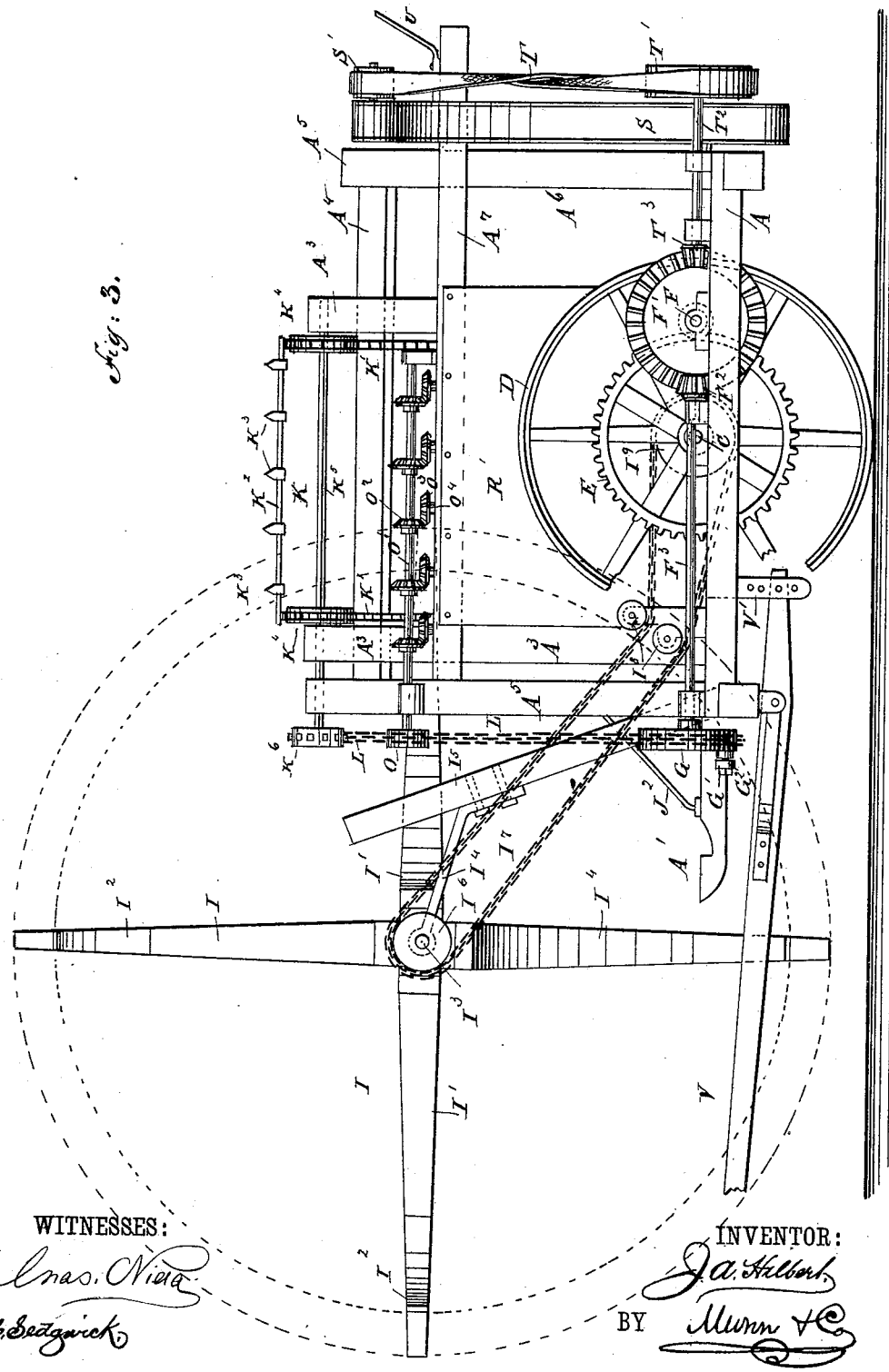

Figure 1 is a plan view of my improvement, the reel being removed and the reel-standard in section. Fig. 2 is a front elevation of the same. Fig. 3 is a side elevation of the same. Fig. 4 is an enlarged sectional front elevation of the elevator and the ear cutting and husking devices. Fig. 5 is an enlarged plan view of the ear-cutting device. Fig. 6 is an enlarged sectional plan view of the ear-husking device, and Fig. 7 is a sectional side elevation of both the ear cutting and husking devices on the line $y\,y$ of Figs. 5 and 6.

My improved machine is provided with the main horizontal frame A, of suitable size and construction, and supported at one side by a wheel, B, and at its other side by the main driving-wheel D, secured to the shaft C, mounted in suitable bearings on said frame A. On the shaft C is also secured the gear-wheel E, meshing into a pinion, E', adapted to turn with and slide laterally on a shaft, F, mounted in suitable bearings on the main frame A. Against the pinion E' presses a spring, E², coiled on said shaft F, and serving to hold said pinion E' in mesh with the gear-wheel E. Against the inner face of said pinion E' is held one end of a lever, E³, fulcrumed on the main frame A and serving to move the pinion E' laterally on the shaft F, so as to disengage the pinion from the gear-wheel E whenever desired. Suitable means are employed to lock said lever E³ in position after disengaging the pinion E' from the gear-wheel E. The spring E² is compressed by the inward movement of the pinion E', and as soon as the lever E is unlocked the spring E² slides the pinion E' into mesh with the gear-wheel E again.

On the shaft F is secured the bevel gear-wheel F', meshing with the bevel-pinion F², secured at one end of the shaft F³, mounted in suitable bearings on the main frame A and extending longitudinally thereof. On the front end of the shaft F³ is secured a crank-disk, G, which also serves as a sprocket-wheel, and is provided with a crank-pin, G', with which is pivotally connected the pitman G², connected with the sickle-bar H' of the cutting mechanism H.

The sickle-bar H' reciprocates on the front beam of the main frame A and is held between the guide-arms H², secured to said front beam of the main frame A and the brackets H³, which support said sickle-bar H', and are also fastened to the front beam. The guide-arms H² diverge from each other toward the front and are provided in their outer ends with notches. To the right and left of said guide-arms H² are the guide-arms A', formed on the front ends of the longitudinal beams of the frame A. The outer ends of the guide-arms A' are pointed and provided with notches similar to those in the guide-arms H².

The purpose of the guide-arms A' and H² is, when the forward end of the frame is inclined downward, to pass under and raise leaning and fallen stalks, and the notches in the arms H² will prevent the stalks from slipping therefrom after they have been severed by the cutting mechanism and when ready to be acted upon by the reel, as will presently be described.

The cutting device H serves to cut the stalks near the ground, and a reel, I, journaled above said cutting device, serves to guide and push the stalks to the cutting device H. Said reel I is provided with the angular arms or spokes I', to each of which is secured, near its outer end, a finger or prong, I², attached at right angles to its respective spoke or arm I'. The spokes or arms I' are fastened to a common hub secured to a shaft, I³, mounted in a bracket, I⁴, which is vertically adjustable on a forwardly-inclined standard, I⁵, secured to and projecting in front of the main frame A, so that the reel I can be raised and lowered, and at the same time adjusted forwardly or rearwardly, according to the height of the corn to be harvested. The reel I and its shaft I³ are rotated from the main driving-shaft C by a chain, I⁷, passing over a sprocket-wheel, I⁶, secured to said shaft I³, and said chain I⁷ also passes over guide-pulleys I⁸ and over a sprocket-wheel, I⁹, secured to said main driving-shaft C. The standing stalks will, when severed, be pushed by the reel-arms rearward upon the transverse supporting-rods J, which incline downward from their outer rearwardly-inclined supporting-bracket, J', secured to the main frame to points in rear of the inner guide-arm, H², then upward under the lower end of the elevator and down toward the beam A². The fallen or inclined stalks when severed will rest on the notched arms, and the bunches gathered thereby will also be carried rearward upon the supports J by said angular reel-arms, which pass through the spaces between the arms H² and A' in front of the machine.

A few of the bars J extend upward from the beam A² in line with the carrier K, and the bars J², extending downward from the front of the main frame and toward the rear over the carrier K, prevent the stalks, when pushed toward the rear by the reel I, from becoming entangled on top of the carrier K. Between the upper ends of the extended stalk-supporting rods J are placed the rods J³, which also extend upward in line with the carrier K and permit the ears, after leaving the rods J, to drop in between said rods J³, so as to hang downward.

The stalk-supporting rods J³ are attached at their lower ends to the inner longitudinal bar of frame A, and their upper ends terminate just above the points of plates P⁴.

The carrier K is provided with endless belts or chains K', carrying the slats K², placed at suitable intervals and each provided with a number of outwardly-projecting prongs or fingers, K³. The endless belts or chains K' pass over the pulleys K⁴, of which the smaller ones are mounted in the lower ends of the inclined beams A³, and the upper larger pulleys, K⁴, are mounted near the upper ends of the said beams A³. The latter are supported at their upper ends by a longitudinally-extending beam, A⁴, secured to the outer ends of the inclined beams A⁵, mounted on top of the main frame A, the said beams A⁵ being braced and strengthened by the beams A⁶, also secured to the top of the main frame A, but extending in an inclined position toward the beams A⁵. The lower ends of the beams A³, supporting the stalk-carrier K, are supported by the standard A⁸, erected on top of the main frame A.

The upper larger pulleys, K⁴, of the stalk-carrier K are secured to a shaft, K⁵, which has its bearings on the beams A³, and is provided at its front end with a sprocket-wheel, K⁶, which is set in motion by a chain, L, passing over the idler L', mounted on a stud secured to the beam A⁵, and said chain L also passes over the sprocket-wheel O, secured to a shaft, O', for operating the ear-cutting device, and said chain L also passes under a sprocket-wheel, N, secured to a shaft, N', and serving to operate the feeding device for delivering the corn to the ear cutting and husking devices, and said chain L also passes over the sprocket-wheel G, which imparts motion to said chain when the machine is moved forward, thus at the same time imparting motion to the ear cutting and husking devices, the feeding device, and the stalk-carrier above mentioned.

The shaft N', which is set in motion by the chain L, as above described, is provided with the sprocket-wheels N², over which pass chains N³, carrying the cross-bars N⁴, placed suitable distances apart, and each being provided with outwardly-extending fingers or prongs N⁵, placed suitable distances apart on said cross-bars N⁴. The chains N³ also pass over the guide-pulleys N⁶, mounted in suitable bearings secured to the beam A⁶, and said chains N³ also pass over the guide-pulleys N⁷, mounted in adjustably-attached bearings on the under side of the beam K⁷.

The shaft O', which is set in motion by the chain L, above described, is provided with a number of bevel gear-wheels, O², each meshing in a bevel gear-wheel, O³, secured to the upper end of a vertical shaft, O⁴, mounted in suitable bearings, O⁵, secured to the longitudinally-extending beam A⁷. Each shaft O⁴, and its mechanism for rotating it, is connected with and is part of an ear-cutting device, P, which consists principally of the toothed stem and husk severing wheel or disk P', mounted on the lower end of said shaft O⁴, which rotates in a horizontal plane between the toothed and curved fixed edges of the plates P², let into the sides of the bracket P³, fastened to the under side of the cross-beam A⁷.

The inner or last tooth of each plate P² is bent downward and extends under the bottom of the toothed wheel P', while the other teeth of the plate P² are in a horizontal plane with the teeth of the stem and husk severing wheel P'. On top of the bracket P³, and in front of the toothed plate P², is placed the guide-plate P⁴, which extends downward at its front end in line with the lower part of the chain K' of the stalk-carrier K. On top of this downwardly-bent end is placed a guard, P⁵, which extends upward in line with said chain K', its other end reaching to within a short distance of the upper ends of the bars K⁷, held directly below the beams A³, and being placed parallel with the same.

The outer end of the bracket P³ is bent downward and supports the corn-husking device Q, which consists, principally, of two sets of spring-plates, Q', of which each set is united to the downwardly-extending front end of the bracket P³ in such a manner as to form a sharp corner, and then the spring-plates Q' extend toward the rear, diverging from each other. Each plate of each set is provided at its inner end with an inwardly-curved extension having at its end a sharp prong or hook, Q², for retaining the corn-husk after the ear has been treated by the cutting or breaking mechanism P, located above.

Directly below the ear cutting and husking devices P and Q, respectively, is located a chute, R, which leads downward to one end of the elevator S, which is similar in construction to the one shown in my former patent above referred to. The upper end of the elevator S is provided with the driving-pulley S', over which passes the crossed belt T, also passing over a pulley, T', secured to the shaft T², mounted in suitable bearings on the main frame A and carrying on its inner end a bevel-pinion, T³, meshing into the bevel gear-wheel F', secured to the auxiliary shaft F, deriving its motion, by means of the gear-wheels E and E', from the main driving-shaft C.

At the rear end of the cross-beam A⁷ is mounted a driver's seat, U, and on the front beam of the main frame A is pivoted the tongue V, extending toward the rear beyond its pivot, and being secured at its rear end by means of a pin to a forked bar, V', extending downward from the main frame A. The forked bar V' is provided with a series of vertical apertures through which said pin passes, so as to adjust the tongue V to any desired height.

The operation is as follows: As the machine is drawn along a row of corn, the sickle cuts the stalks, and the reel I, by means of its inclined arms I', pushes the stalks back crosswise upon the inclined stalk-supporting rods J, down which they slide to the lowest point of said supporting-rods, which is at the lower ends of the inclined side beams, A³. In corn, where part of it is broken down, it is necessary to have a reel that can be adjusted very near to the ground, so as to catch the "down stalks" as they are raised by the arms H² A', and yet not hook under the ears of the standing stalks. My reel is therefore journaled on the inclined standard in front of the main frame, so that by moving the bracket the reel is adjusted in two directions, as before explained, to bring the outer angular arms of the reel to span the arms H² without interfering with the cutting mechanism, and the inclined arms I' will not allow crooked or snarled stalks or hanging ears to catch on and hang to the reel. The ears on the stalks hang down between the supporting-rods, and in case some of the ears remain on said supports J they drop down after leaving said supports when passing upon the supports J³, as before described. When the stalks arrive at the lower ends of said supports J, they are caught by the projecting pins or prongs K³ and are conveyed upward over the inner ends of the extending supports J and upon the supports J³, their outer ends resting on said beams K⁷, held directly below the beams A³, supporting the stalk-carrier K. Before the stalks reach the husking and cutting devices P and Q all the ears hang downward from the under sides of their stalks sufficiently to be caught under the top flanges of the fixed plates P⁴, being pushed between said plates P⁴ by the fingers or prongs N⁵, secured to the cross-beams N⁴, traveling with the chains N³. Said fingers N⁵ pass between the sets of ear-guiding plates P⁴, and thus push the ears upon the bottom sides of the plates after the ears leave the inclined lower parts of said plates P⁴. The stalks are drawn upward over the inclined fingers P⁵ by the projecting teeth or prongs K³, and are finally delivered upon an incline, upon which said stalks are placed in bunches, and are removed to the ground or to a wagon after a sufficient number have accumulated. The inclined points of the plates P⁴ guide the ear between the lower spring-arms without pulling on the ear before it is led under the side flanges of said plates P⁴. As the stalk is moved up on the inclined prongs P⁵, the ear is drawn between the lower spring-arms Q' and the plates P⁴, with its butt-end against the under side of the plates P⁴. Then the ear is separated from the stalk. Should the stem connecting the ear and the stalk be short or the strain so great as to break the stem before the ear reaches the toothed stem and husk severing wheel or disk P', that will not interfere with the successful husking of said ear, as the spring-arms Q' hold the ear in place until it is pushed to the cutting wheel or disk P' by the cross-bar N⁴ and its fingers or prongs N⁵. The lower spring-arms Q' are attached in such a manner that an ear can easily slide upward between them; but the projecting upper edges of the spring arms prevent them from slipping downward. The chains N³ run about twice as fast as the carrier-chains K', so that each cross-bar N⁵ is directly behind the ear as it reaches the inclined ends of the plates P⁴, and then overtakes it and brings it up square to the cutting-wheel P'. The two sets of chains N³ and K' are also timed so that each cross-bar N⁴ will always follow a cross-bar, K², and the two corresponding cross-bars N⁴ and K² will be in perpendicular line with each other at about the forward edge of the toothed wheel P'. The prongs N⁵ of the cross-bars N⁴ come up to the points of the ear-guiding plates P⁴ after the ear is partly drawn between the lower spring-arms Q', and then follow the ear and force it through between the lower spring-arms Q', the projecting points Q² of which tear the husk open and off from the side of the ear, while the revolving toothed stem and husk severing wheel P' and the stationary toothed plate P², which are a little below the flanges of the plates P⁴, break the stem and husk from the ear, which is now placed in the chute R and guided to the trough of the elevator S, to which it is conveyed in the usual manner by an endless belt provided with blocks, so as to prevent the ears from shooting back, and the ears are finally discharged into a wagon drawn at the side of the machine. The toothed wheels or disks P' do not of themselves cut the husks from the ear, but sever the husk and stem from the ear by their teeth entering the husk at one side of the ear and the teeth of the plates P² entering the husks on the opposite side at the butt of the ear, the two thereby breaking or splitting the husk and stem from the ear. Another object in making the plates P² toothed is to make them take a firm hold on the husk by piercing the same, so that the ears when striking the teeth will not slip backward or downward and so escape being acted upon by the tooth-wheels, which engage the opposite part and impart a rolling motion to the ear as it is carried rearward.

Having thus fully described my invention, I claim as new and desire to secure by Letters Patent—

1. In a corn-harvester, the combination, with the frame, the cutting mechanism at the front thereof, and the guide-arms at opposite ends of the cutter, of the vertical reel journaled at the front of the frame and having spokes or arms provided toward their outer ends with prongs or fingers forming, in connection with the ends of the spokes, angle-arms extending below and passing at opposite sides of the guide-arms and so as to remove the stalks therefrom, substantially as set forth.

2. In a corn-harvester, the combination, with the frame, the cutting mechanism, and the guide-bars at the front thereof, of the forwardly-inclined standard I⁵, secured at its lower end to the front of the main frame, the vertically-adjustable bracket I⁴ on said standard, the vertically-revolving reel journaled in said bracket and having inclined spokes or arms I', and the fingers or prongs I², secured to said spokes at right angles thereto, fingers or arms, and the ends of the spokes or arms extending below and outside of the said guides, substantially as set forth.

3. In a corn harvesting and husking mechanism, the combination, with the endless stalk-carrier K, of the toothed stem and husk severing wheel or disk under the same, a stationary plate adjacent to said wheel, a space for the ear being forced between the plate and wheel, and the endless chain having fingers for forcing the ears to the wheel and stationary plate and revolving at a greater speed than the stalk-carrier, substantially as set forth.

4. In a corn harvesting and husking machine, the combination, with a toothed wheel and a stationary toothed plate, of guide-plates leading to said toothed wheel, and endless chains carrying cross-arms provided with fingers passing between said plates, so as to force the ears along said plates to said toothed wheel and its toothed plate, substantially as shown and described.

5. In a corn harvesting and husking machine, the combination, with the carrier K, provided with the cross-bars K², having fingers K³, of the beams K⁷, extending in line with said carrier K and supporting the stalks conveyed upward by said carrier, the plates P⁴, each provided with an inclined end extending in line with said carrier, and the endless chains N³, provided with cross-beams N⁴, having prongs or fingers N⁵, for pushing the ears between said plates P⁴, substantially as shown and described.

6. In a corn harvesting and husking machine, the endless chain K', the cross-bars K², held on said endless chains K', the fingers or prongs K³, extending outward from said bars K², and the guide-rods J³ and the beams K⁷, both extending in line with the chain K', in combination with the plates P⁴, extending horizontally and each having a downwardly-inclined receiving end extending in line with said chain, the inwardly-extending prongs P⁵, secured to said plates P⁴, for supporting the stalks while the ears are being removed, the endless chains N³, the cross-beams N⁴, secured to said chains N³, and the prongs or fingers N⁵, for pushing the ears between said plates P⁴ and along the same, substantially as shown and described.

7. The combination, with the brackets, the plates P⁴ on the upper sides thereof, a parallel plate, P², secured to each bracket at one side thereof, and the rotary stem and husk severer at the rear end of said plates, of the sets of diverging spring-plates Q' under each plate P², their free ends lying adjacent to the rotary severer, substantially as set forth.

8. In a corn harvesting and husking machine, the combination, with the guide-plates and the horizontal toothed plate P², of the horizontally-rotating toothed wheel P', between which and the said plate the stems and adhering husks are acted upon, substantially as set forth.

9. In a corn harvesting and husking machine, the stem and husk severing toothed wheel P' and the stationary toothed plate P², extending in line with the teeth of said wheel P' and having a downwardly-extending tooth reaching under said wheel P', and the spring-plates Q', each having on its outer end a hook, Q², for holding the husk while the latter and the stems are being severed from the ear by said wheel and said toothed plate P², substantially as shown and described.

10. In a corn harvesting and husking machine, the combination, with the reel I, having the inclined arms or spokes I', each provided with a prong, I², of the guide-arms H², diverging at their outer ends, having notches at their front ends, and the guide-arms A', extending from the main frame of the machine, and also provided with notches at their front ends, so as to prevent the stalks from sliding off after being cut, substantially as shown and described.

11. In a corn-harvesting and husking machine, the combination, with the reel I and the guide-arms A' and H², each provided with notches near its pointed front end, of the inclined supporting-rods J, upon which the stalks are forced by said reel I, the guide-rods J², and the carrier K, for conveying the stalks upward at the under side of said carrier, said stalks being prevented from falling upon the carrier by said rods J², substantially as shown and described.

12. In a corn harvester and husker, the combination, with the frame, the stalk-cutting mechanism at the front thereof, the reel journaled above the cutter, the transverse supporting-rods J, inclined inward and downward from the side of the frame to a point in rear of the cutter and then upward and downward to the frame, and the supporting-rods J³, extending upward beyond the lower ends of rods J and at about the same inclination, of the inclined stalk-carrier K over said bars J J³, and extending at its lower ends to the bends in the former, substantially as set forth.

JOHN ALOYSIUS HILBERT.

Witnesses:
JOSEPH KETTENMAIER,
M. J. HEIRES.